United States Patent
Onyekwelu

(10) Patent No.: US 10,921,883 B2
(45) Date of Patent: Feb. 16, 2021

(54) EYE TRACKING FOR MANAGEMENT OF MOBILE DEVICE

(71) Applicant: International Business Machines Corporation, Armonk, NY (US)

(72) Inventor: Adaoha Onyekwelu, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/250,095

(22) Filed: Jan. 17, 2019

(65) Prior Publication Data

US 2020/0233490 A1 Jul. 23, 2020

(51) Int. Cl.
G06F 3/01 (2006.01)
H04B 1/3827 (2015.01)

(52) U.S. Cl.
CPC ............ G06F 3/013 (2013.01); H04B 1/3827 (2013.01)

(58) Field of Classification Search
CPC ...... B41J 2202/21; B41J 2/04; B41J 2/14201; B41J 2/1433; B41J 2/155; B41J 2/16535; B41J 2/16538; B41J 2/16585; G06F 2203/011; G06F 3/013; G06F 8/38; G06F 9/451; H04B 1/3827
USPC ................................................ 345/156, 690
See application file for complete search history.

(56) References Cited

U.S. PATENT DOCUMENTS

| | | | |
|---|---|---|---|
| 8,487,775 B2 | 7/2013 | Victor et al. | |
| 8,643,680 B2 | 2/2014 | Baldwin et al. | |
| 8,988,345 B2* | 3/2015 | Ackerman | G06F 1/325 345/156 |
| 9,286,794 B2 | 3/2016 | Duncan et al. | |
| 9,975,483 B1* | 5/2018 | Ramaswamy | B60W 40/08 |
| 2004/0208496 A1* | 10/2004 | Pilu | H04N 5/23218 396/263 |
| 2009/0024964 A1* | 1/2009 | Kantamneni | G06Q 30/02 715/854 |
| 2011/0279666 A1* | 11/2011 | Strombom | G06K 9/00604 348/78 |
| 2012/0300061 A1* | 11/2012 | Osman | G06F 3/013 348/135 |
| 2013/0156265 A1* | 6/2013 | Hennessy | H04N 13/383 382/103 |
| 2015/0031349 A1 | 1/2015 | Hill et al. | |
| 2015/0316983 A1 | 11/2015 | Park et al. | |

(Continued)

*Primary Examiner* — Tony O Davis
(74) *Attorney, Agent, or Firm* — Cantor Colburn LLP; Teddi Maranzano

(57) ABSTRACT

A mobile device includes an eye sensor and an eye track control system. The eye detection sensor detects movements of a human eye generates an eye detection signal indicative of detected eye movements of a user. The eye tracking control system determines a concentrated state of the user and a distracted state of the user based on the detected eye movements. The eye tracking control system is further configured to selectively operate the mobile device in different modes based on the concentrated state and the distracted state. The eye tracking control system operates the mobile device in a first mode that provides a plurality of device capabilities to the user in response to determining the concentrated state, and operates the mobile device in a second mode that applies at least one limitation to the plurality of device capabilities in response to determining the distracted state.

14 Claims, 9 Drawing Sheets

(56) References Cited

U.S. PATENT DOCUMENTS

2016/0231812 A1    8/2016  Hansen et al.
2019/0050323 A1*   2/2019  Kogan ................ G06F 11/3664
2019/0354334 A1*  11/2019  Billinghurst ........... A61B 5/165

* cited by examiner

EYE TRACKING FOR MANAGEMENT OF MOBILE DEVICE

BACKGROUND

The present invention generally relates to electronic mobile devices, and more specifically, to a system and method for controlling operation of a mobile device.

With the recent advancements in technology, mobile devices have become increasingly more affordable to the consuming public. The portability, convenience, and resulting popularity of these devices have inspired the development and deployment of an abundance of various mobile applications for use with these devices, each designed to appeal to the differing needs and interests of these consumers. Currently, most mobile devices on the market offer text messaging for enabling communications in the form of text, as opposed to voice communications. In addition, mobile devices such as smartphones typically include one or more cameras, which make image capturing more accessible.

SUMMARY

According to a non-limiting embodiment, a mobile device includes an eye sensor and an eye track control system. The eye detection sensor detects movements of a human eye generates an eye detection signal indicative of detected eye movements of a user. The eye tracking control system determines a concentrated state of the user and a distracted state of the user based on the detected eye movements. The eye tracking control system is further configured to selectively operate the mobile device in different modes based on the concentrated state and the distracted state. The eye tracking control system operates the mobile device in a first mode that provides a plurality of device capabilities to the user in response to determining the concentrated state, and operates the mobile device in a second mode that applies at least one limitation to the plurality of device capabilities in response to determining the distracted state.

According to another non-limiting embodiment, a method of operating a mobile device is provided. The method comprises detecting, via an eye detection sensor, movements of a human eye, generating, via the eye detection sensor, an eye detection signal indicative of detected eye movements of a user of the mobile device, and determining, via an eye tracking control system, a concentrated state of the user and a distracted state of the user based on the detected eye movement. The method further comprises selectively operating the mobile device in different modes based on the concentrated state and the distracted state, wherein selectively operating the mobile device in different modes comprises operating the mobile device in a first mode that provides a plurality of device capabilities to the user in response to determining the concentrated state, and operating the mobile device in a second mode that applies at least one limitation to the plurality of device capabilities in response to determining the distracted state.

According to still another non-limiting embodiment, a computer program product is provided to control a mobile device. The computer program product comprises a computer readable storage medium having program instructions embodied therewith. The program instructions are executable by an electronic computer processor to control the mobile device to perform operations comprising detecting, via an eye detection sensor, movements of a human eye, generating, via the eye detection sensor, an eye detection signal indicative of detected eye movements of a user of the mobile device, and determining, via an eye tracking control system, a concentrated state of the user and a distracted state of the user based on the detected eye movement. The operations further comprise selectively operating the mobile device in different modes based on the concentrated state and the distracted state, wherein selectively operating the mobile device in different modes comprises operating the mobile device in a first mode that provides a plurality of device capabilities to the user in response to determining the concentrated state, and operating the mobile device in a second mode that applies at least one limitation to the plurality of device capabilities in response to determining the distracted state.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
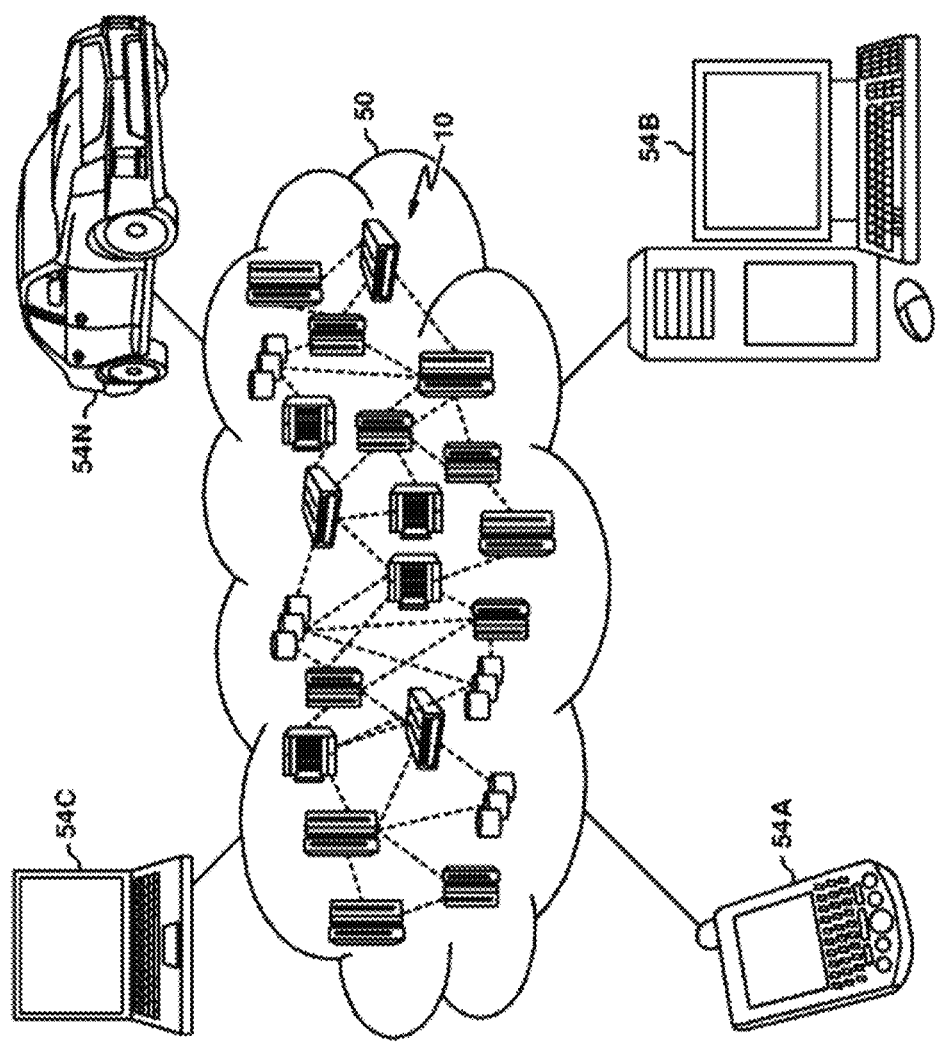
FIG. 1 depicts a cloud computing environment according to a non-limiting embodiment.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, text messaging (also known as "texting") enables the user of the mobile device to compose a message in text format via buttons on a keypad of the device or via a touch input screen, which in either case facilitates the input of alphanumeric characters. Composing a text-based communication typically requires near-constant visualization of the keypad by the user for a period of time sufficient to allow access of the text messaging application on the device, identification (or entry) of an address to which the message will be sent, composition of the communication content, and selection of an option that directs the mobile device to transmit the message.

Due to the nature of text messaging, a user is typically required to visually focus on the device for a period of time.

Therefore, text messaging is not conducive in certain situations that require extended visual and/or mental focus, such as operating a vehicle. Texting while driving has become an increasing concern, particularly its use among young adults who are most inclined to engage in this activity. Due to its inherent nature, texting while driving can dramatically increase the likelihood of the driver being involved in an accident.

Several approaches have been taken to alleviate the concerns associated with operating a mobile device while driving. These approaches include posting signs to remind drivers of the dangers of texting while driving and issuing public service announcements. Providing this valuable information/reminders may resonate with some drivers, but is largely ignored by many others, in part, because the rewards of texting typically outweigh the perceived risks (e g, many drivers do not appreciate the potential risks involved with this activity). Various hands-free methods of mobile device operation have been devised, however, these methods are only useful if willingly implemented by the user. Unfortunately, there is no way to ensure such hand-free methods will be employed.

Many communities have established laws make texting while driving a civil infraction. Unfortunately, however, enforcement of such legislation is generally ineffective as texting can be performed in the vehicle with the device out of clear view of law enforcement officials (e.g., below the wheel). Additionally, many law enforcement agencies are inundated with other traffic management matters (e.g., speed enforcement, expired vehicle registrations/inspection stickers, accidents, and road repair management, etc.) and, as a result, lack the necessary resources to monitor this activity.

Mobile device also typically include one or more cameras. Some user's, however, have been known to capture self-images of themselves and/or images of passengers in the car while driving. Not only is the act of capturing images while driving dangerous, users typically go one step further and continue operating the device to post the captured image to one or more social media sites while driving.

The consequences of operating a mobile device while driving can be extensive. For example, parents of children who are inexperienced drivers may be concerned that the lack of driving experience, coupled with the visual and mental distraction attributed to texting behind the wheel, places these children at great risk of harm or loss of life. Likewise, various businesses may also be affected by this activity. For example, a business that employs individuals to operate vehicles (e.g., trucking companies, limousine services, etc.) during the course of employment may be concerned about insurance costs and resulting financial liability for those employees who may become involved in an accident as a result of texting while driving. Additionally, mass transportation companies (e.g., bus, train, subway, etc.), whose operators were found to be texting while driving at the time of an accident, have not only experienced millions of dollars in damage to property/cargo, but have also faced related medical and/or legal liabilities.

Turning now to an overview of the aspects of the invention, one or more embodiments of the invention address the above-described shortcomings of the prior art by providing for a mobile device capable of determining the attentive state of the user, and to control the operation of the mobile device based on the determined attentive state. In one or more non-limiting embodiments, a mobile device detects movements of a human eye and generates an eye detection signal indicative of the detected eye movements. The mobile device includes an eye tracking control system that is configured to determine a concentrated state of the user and a distracted state of the user based on the detected eye movements, and to selectively operate the mobile device in different modes based on the concentrated state and the distracted state.

In one or more embodiments, a user in a concentrated state is afforded the full operating capabilities of the mobile device, while a user in a distracted state is allowed to operate the mobile device in a limited capacity. For instance, when the distracted state of the user is detected, text messaging, touch inputs and/or camera usage may be disabled while still allowing a user to operate the mobile device using voice recognition commands. In this manner, a user may be forced to remove themselves from a distracted situation in order to operate the mobile device according to its full operating potential.

Referring now to FIG. 1, an illustrative cloud computing environment 50 is depicted according to a non-limiting embodiment. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
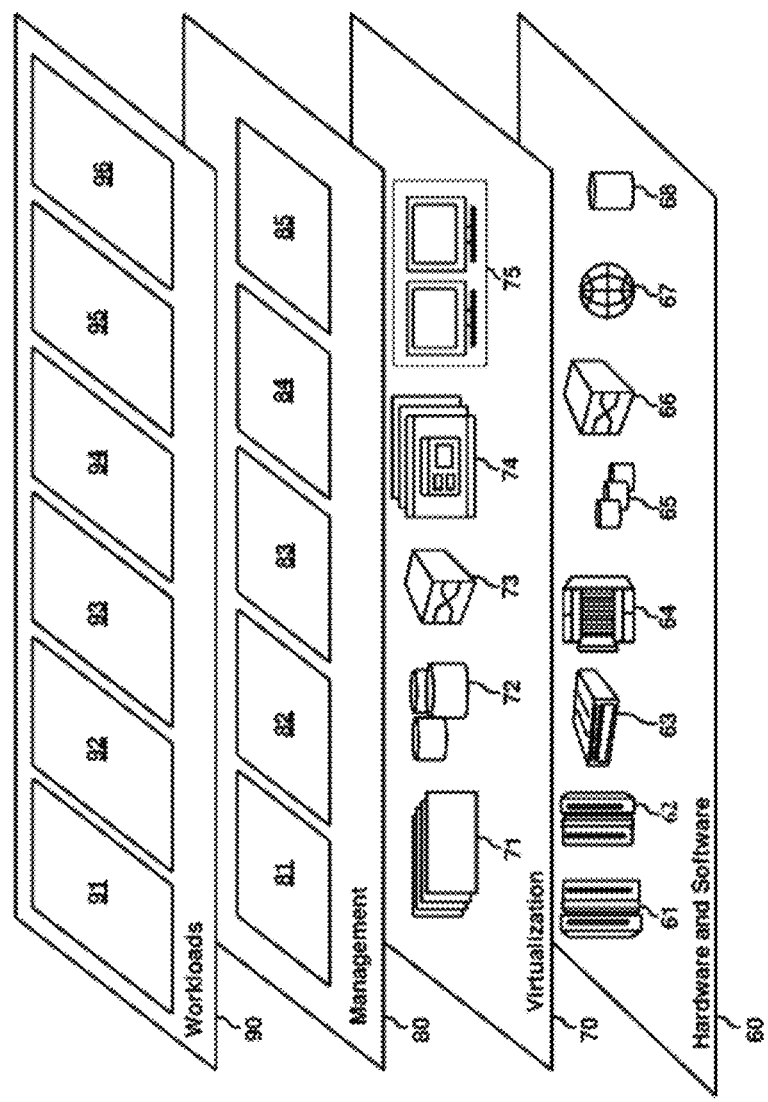
FIG. 2 depicts abstraction model layers of a computing system according to a non-limiting embodiment.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image recognition and visualization processing 96.

Figure 3:
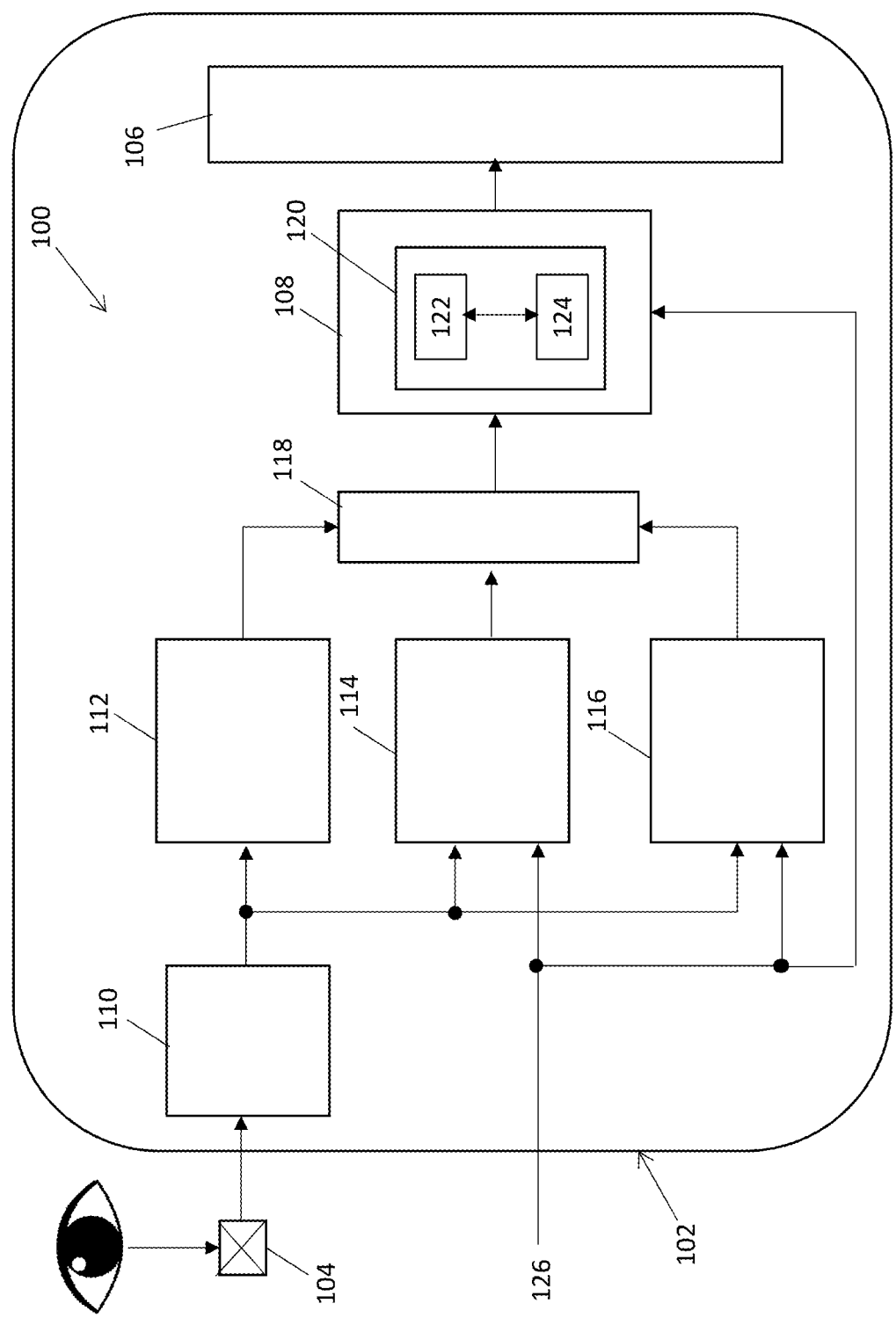
FIG. 3 is a block diagram illustrating an eye tracking control system for controlling operation of a mobile device according to a non-limiting embodiment.

With reference now to FIG. 3, an eye tracking control system 100 capable of controlling operation of a mobile device 102 is illustrated according to a non-limiting embodiment. The mobile device 102 includes, but is not limited to, a phone (e.g., smartphone), computer tablet, and a smartwatch. The eye tracking control system 100 includes an eye detection sensor 104, a display unit 106, a main processor 108, an eye tracking unit 110, an eye tracking visualization unit 112, an input timing unit 114, an input pattern unit 116, and a permissions unit 118. Any one of the one of the main processor 108, eye tracking unit 110, eye tracking visualization unit 112, input timing unit 114, input pattern unit 116, and permissions unit 118 can be constructed as an individual electronic hardware controller that includes memory and a processor configured to execute algorithms and computer-readable program instructions stored in the memory. In addition, the main processor 108, eye tracking unit 110, eye tracking visualization unit 112, input timing unit 114, input pattern unit 116, and permissions unit 118 can all be embedded or integrated in a single controller.

The main processor 108 is in signal communication with the display unit 106, which can receive touch inputs applied thereto. The main processor 108 includes a memory unit 120 that stores an operating system 122 along with one or more software applications (Apps) 124. The main processor 108 operates in conjunction with the operating system 122 to perform various tasks including, but not limited to, a touch-screen input execution, cellular data exchange, Bluetooth data exchange, Wi-Fi, data exchange, Wi-Fi Protected Access, Global Positioning System (GPS) mobile navigation, video and image capturing, video and image display, speech recognition, voice recording, sound, audio and music playback, and near field communication. The main processor 108 can also control the operation of various hardware devices configured to facilitate the aforementioned tasks. The hardware devices can include, but are not limited to, a camera, an audio speaker, a display unit, and touch-screen detection sensors.

The OS 122 is configured to support and launch one or more of the Apps 124 in response to being selected by the user. The Apps 124 are computer programs or software applications designed to run on the mobile device 102 to perform a dedicated task. The dedicated tasks include, but are not limited to, texting, photo editing, social media interaction, Email management, calendar organization, and contact information organization, mobile video games, GPS and location-based services, order-tracking, music and audio management, and weather data retrieval.

The eye tracking unit 110 is in signal communication with the eye detection sensor 104 to receive an eye detection signal. Based on the eye detection signal, the eye tracking unit 110 can determine at least one characteristic of the eye movements of a user. The eye characteristics include, but are not limited to, gaze points and fixations.

Gaze points are instantaneous spatial locations of a visual axis landing on a stimulus. As such, they have an (x, y) coordinate and a timestamp corresponding to its measurement. A fixation is the period of time where the eye is kept aligned with the target for a certain duration, allowing for image details to be processed. Fixations include multiple gaze points, and have duration in addition to a spatial (x, y) location and start and end timestamps. In one or more embodiments, the eye tracking unit 110 employs a mathematical algorithm that translates a sequence of raw gaze points into an associated sequence of fixations, and outputs an eye detection signal indicative of a user' fixations. Accordingly, the eye detection signal can indicate a real-time episode of a user's looking pattern upon the display unit 106.

The eye tracking unit 110 can also detect saccades, vergence, smooth pursuit (including eye velocity), and vestibular ocular reflex. Saccades are the type of eye movement used to move a user's eye rapidly from one point of interest to another. Accordingly, the eye tracking unit 110 can detect saccades as the quick, simultaneous movement of both eyes between two or more phases of fixation in the same direction. Vergence movements occur when a user focuses on objects placed at different distances, and the smooth pursuit occurs when aiming to keep the eye aligned with moving objects. Vestibular ocular reflex occurs to maintain the eye pointed at a point of interest when a user's head and body are moving. Accordingly, one or more of the eye detected characteristics can be output from the eye tracking unit 110 and used to determine the user's concentrated state and distracted state as described in greater detail below.

The eye tracking visualization unit 112 is in signal communication with the eye tracking unit 110, and is configured to generate a graphical representation of the detected eye movements of the user. The graphical representation includes, but is not limited to, a gaze plot and a fixation heat map.

A gaze plot can represent a location, order, and duration at which the user looks at locations of the display unit 106. Accordingly, the gaze plot can indicate a time sequence corresponding to a given location where the user looks on the display unit 106 and when the user looks at the given location. In other words, a gaze plot can indicate a time period at which a user spends looking at the given location of the display unit 106, which is referred to as "fixation duration."

Figure 4:
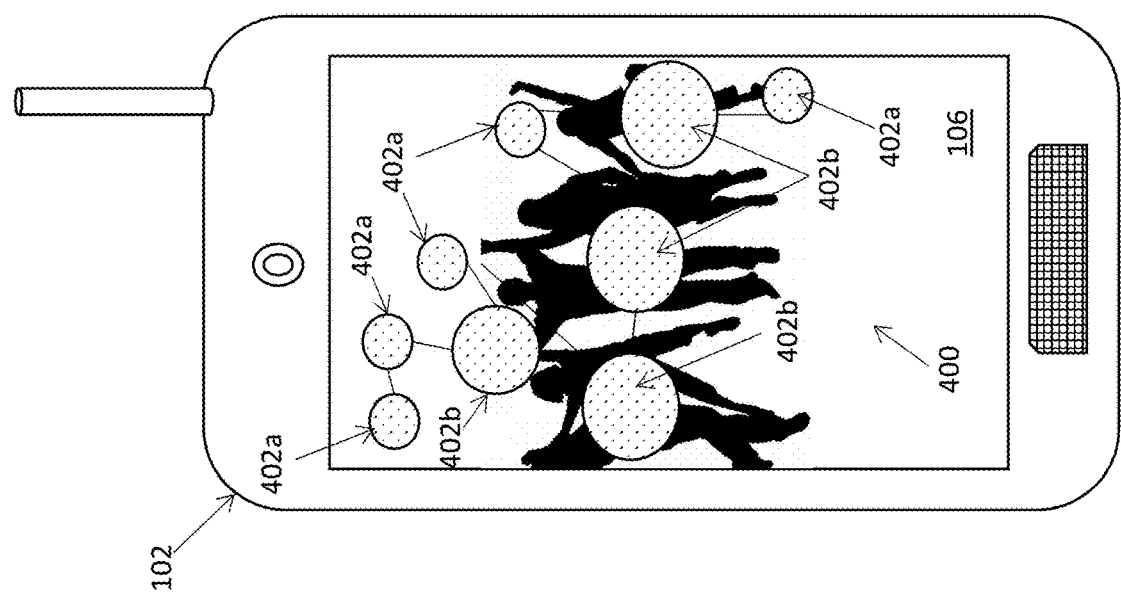
FIG. 4 depicts a mobile device employing a gaze plot detecting a concentrated state of a user according to a non-limiting embodiment.
Figure 5:
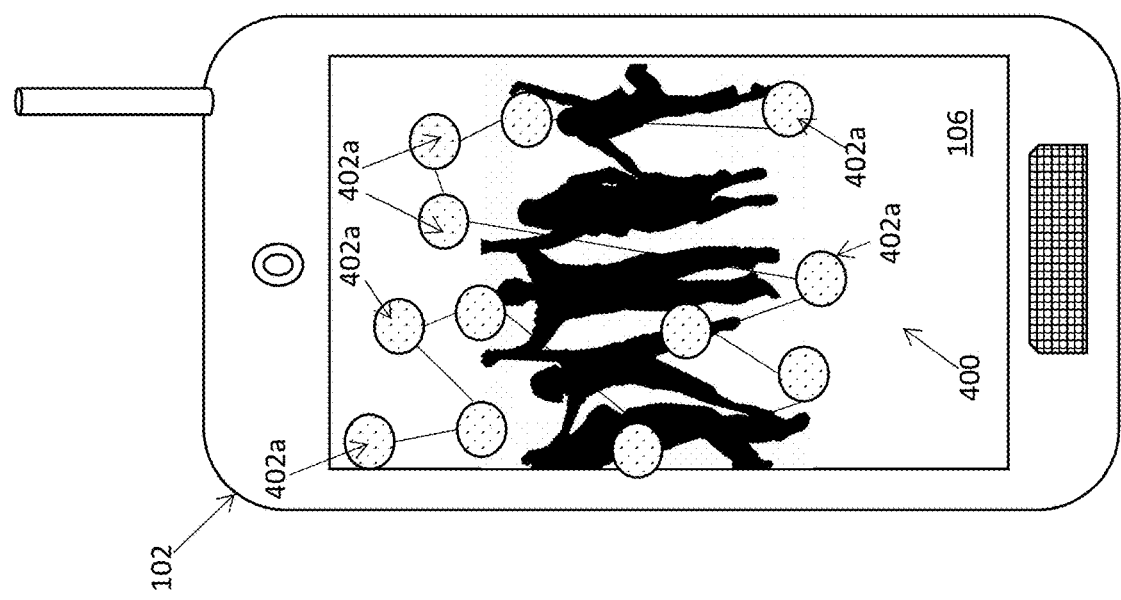
FIG. 5 depicts a mobile device employing a gaze plot detecting a distracted state of a user according to a non-limiting embodiment.

Referring to FIGS. 4 and 5, for example, gaze plots 400 generated by the eye tracking visualization unit 112 are illustrated according to non-limiting embodiments. The gaze plots 400 include one or more fixation circles 402a and 402b. Each of the fixation circles 402a and 402b represents an individual fixation on the display unit 106. The diameter of the fixation circles 402a and 402b is based on the fixation duration.

For instance, the example shown in FIG. 4 includes different sized fixation circles 402a and 402b. The fixation circles 402b having the larger diameter indicate a longer fixation duration compared to fixation circles 402a having the smaller diameter. The example shown in FIG. 5, however, includes only small diameter fixation circles 402a. This indicates that the user is applying very short fixations on to the display unit 106, which is typical when a user is distracted such as, for example, when a user is driving a motor vehicle. Accordingly, the fixation durations represented by the fixation circles 402a and 402b can be used to determine the user's concentrated state and distracted state. For example, fixation circles 402b that greater than or equal to a diameter threshold can indicate a concentrated gaze while fixation circles having a diameter less than the diameter threshold can indicate a distracted gaze. In one or more embodiments, a concentrated state of a user can be determined when a number of fixation 402b having a diameter greater than or equal to the diameter threshold exceeds a threshold value. Similarly, a distracted state of a user can be determined when a number of fixation circles 402a having a diameter that is less than the diameter threshold is below the threshold value.

Figure 6:
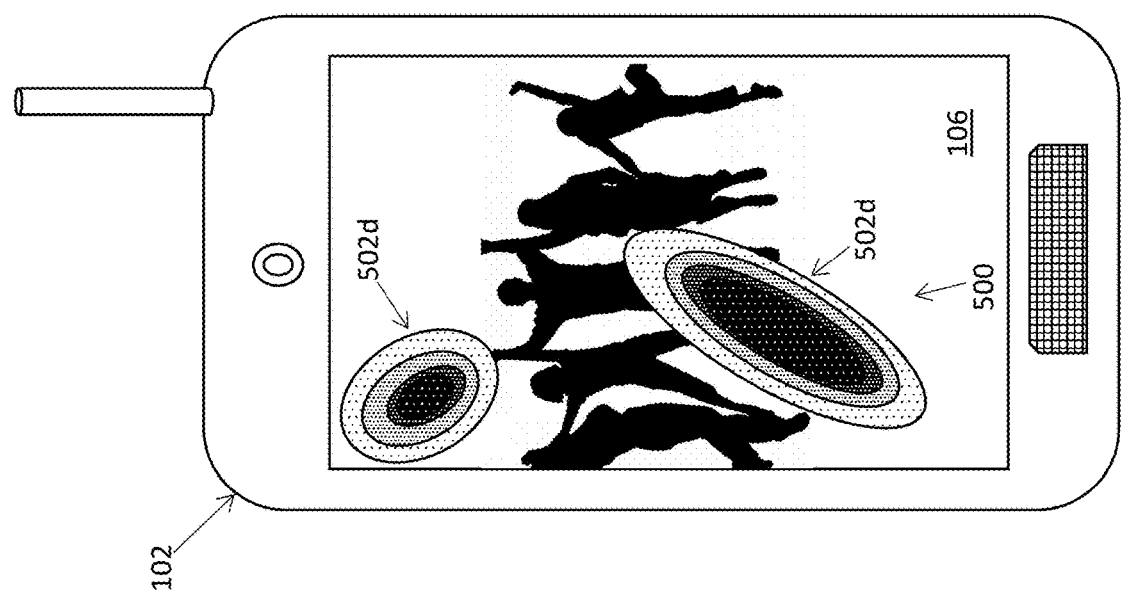
FIG. 6 depicts a mobile device employing a fixation heat map detecting a concentrated state of a user according to a non-limiting embodiment.
Figure 7:
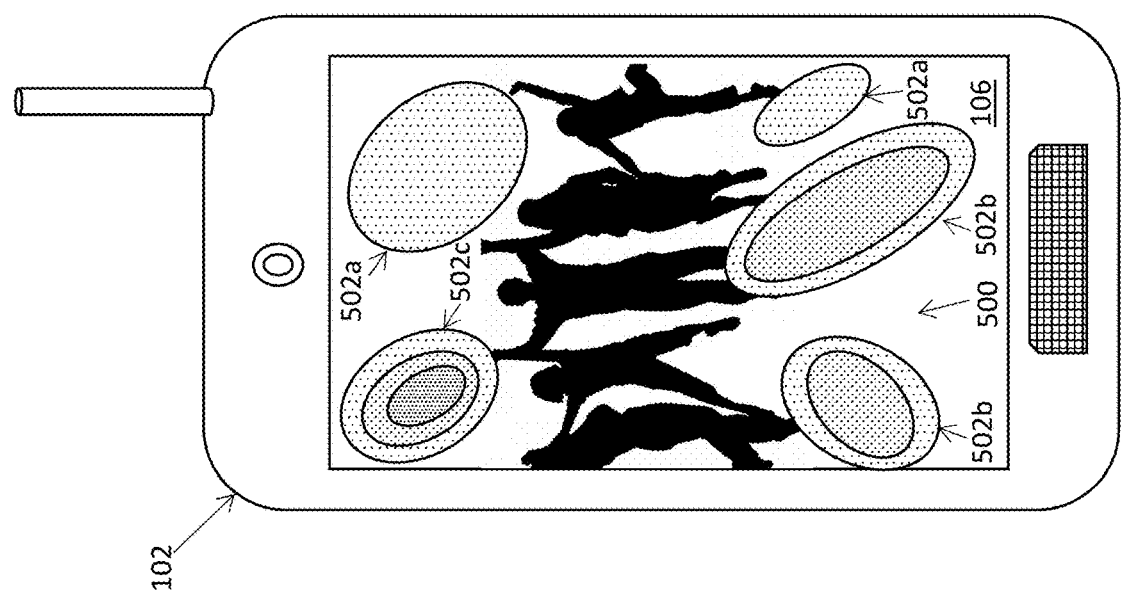
FIG. 7 depicts a mobile device employing a fixation heat map detecting a distracted state of a user according to a non-limiting embodiment.

The fixation heat maps can also be used to detect the user's concentrated state and distracted state. FIGS. 6 and 7, for example, illustrate fixation heat maps 500 according to a non-limiting embodiment. The fixation heat maps 500 represent a level of focused visual attention to one or more locations of the display unit 016. The fixation heat maps 500 include given fixated locations 502a-502d of the display unit 106. The fixated locations 502a-502d range in color corresponding to an intensity or level of fixation at the given location. Each fixated location 502a-50d includes a color spectrum extending from one color to another color and represents a fixation intensity at the fixated location 502a-502d. For example, the color spectrum can increase from green to red (i.e., green being the least fixated and red being the most fixated) where the fixation intensity indicates a level of the user's focus on a given location of the display unit 106.

A level of concentration can be determined based on a comparison between the color of a given fixated location and a color threshold. Colors that exceed a color threshold can indicate a concentrated state, while colors that are below the color threshold can indicate a distracted state.

In the example shown in FIG. 6, the fixation heat map 500 includes two fixated locations 502d. The fixated locations 502d are shown as dark color regions, indicating that a user is applying a high-intensity focus at these locations 502d. Accordingly, it can be determined that the user is in a concentrated state.

The heat map 500 shown in FIG. 7, however, includes five fixated locations 502a, 502b, and 502c. These fixated locations 502a, 502b, and 502c are shown as lighter color regions compared to the fixated locations 502d shown in FIG. 6. Accordingly, it can be determined that the user in this scenario is applying a lower intensity focus and is therefore in a distracted state.

Turning now again to FIG. 3, the input timing unit 114 is in signal communication with the eye detection sensor 104 to receive the eye detection signal indicating the detected eye movements of the user. The input timing unit 114 is also configured to detect an input 126 delivered to the mobile device 102 while receiving the detected eye movements, i.e., while the user is looking at the display unit 106. The input 126 delivered to the mobile device 102 includes, but is not limited to, touch inputs applied to the display unit, keyboard inputs or typing inputs, gesture inputs, and camera image inputs. In response to receiving an input 126 while detecting the eye movements of the user, the input timing unit 114 operates to determine an input rate at which the input 126 is delivered.

In terms of a typing input 126, for example, the input timing unit 114 determines the rate at which the characters are input (e.g. typed). Typically, a distracted user (e.g., a user driving a motor vehicle) that is constantly transitioning their eyes from the road to the mobile device 102 will type letters and words at a slower rate than a non-distracted user. Accordingly, the input rate can be used to determine the concentrated state or the distracted state of the user.

The input pattern unit 116 is also in signal communication with the eye detection sensor 104 to receive the eye detection signal indicating the detected eye movements. The input pattern unit 116 is also configured to detect the input 126 delivered to the mobile device 102 while receiving the detected eye movements, and to determine an input pattern of the input 126. In at least one non-limiting embodiment, the input pattern is an error rate at which the input 126 is delivered to the mobile device 102. The error rate can be based on a comparison between a number of errors (e.g., misspellings) included in the input 126 over a set time period.

In terms of a typing input 126, for example, a distracted user (e.g., a user driving a motor vehicle) that is constantly transitioning their eyes from the road to the mobile device 102 will type a greater number of misspelled words compared to a non-distracted user. Accordingly, the pattern (e.g., error rate) of the input 126 can be used to determine the concentrated state or the distracted state of the user.

The permissions unit 118 is in signal communication with the eye tracking visualization unit 112, the input timing unit 114, and the input pattern unit 116. The permission unit 118 is configured to determine the user's attentive state (i.e., a concentrated state and a distracted state) based on one or a combination of the fixation duration (determined by the gaze plot), the level of focused visual attention (determined by the heat map), the input rate, and the input pattern. Accordingly, the permission unit 118 outputs a permissions signal based on the concentrated state and the distracted state. In at least one embodiment, the permissions signal includes either a permission accepted signal generated in response to detecting the concentrated state or a permission denied signal generated in response to detecting the distracted state.

In one or more non-limiting embodiments, the permissions unit 118 detects the concentrated state and the distracted state based on a comparison between the fixation intensity and a fixation intensity threshold. For example, the permissions unit 118 can detect the concentrated state in response to determining the fixation intensity is greater or equal to the fixation intensity threshold, and can detect the distracted state in response to determining the fixation intensity is less than fixation intensity threshold.

In one or more embodiments, the permissions unit 118 can detect the concentrated state and the distracted state based on a comparison between the fixation duration and a fixation duration threshold. For example, the permissions unit 118 detects the concentrated state in response to determining that the fixation duration is greater or equal to the fixation duration threshold, and detects the distracted state in response to determining the fixation duration is less than the fixation duration threshold.

In one or more embodiments, the permissions unit 118 detects the concentrated state and the distracted state based on a comparison between the input rate and an input rate threshold. For example, the permission unit 118 detects the concentrated state in response to the input rate being greater or equal to the input rate threshold and detects the distracted state in response to the input being less than the input rate threshold.

In one or more embodiments, the permissions unit 118 detects the concentrated state and the distracted state based on a comparison between the error rate and an error rate threshold. For example, the permissions unit 118 detects the concentrated state in response to the error rate being less than or equal to the error threshold value, and detects the distracted state in response to the error rate exceeding the error threshold value.

Regardless as to which technique described above is used by the permissions unit 118, the main processor 108 and the permission unit 118 work together to control the operation of the mobile device 102 based on the detected state. In at least one non-limiting embodiment, the main processor 108 operates the mobile device 102 in a first mode (e.g., a distracted mode) that applies at least one operating limitation to the mobile device 102 in response to receiving the permission denied signal, and operates the mobile device 102 in a second mode (a normal mode) that removes the at least one operating limitation in response to receiving the permission accepted signal. The operating limitations applied when invoking the distracted mode include, but are not limited to, over-riding the input to mobile device 102, disabling the touch screen of the display unit 106, and disabling the camera of the mobile device 102. Accordingly, the permissions unit 118 and main processor 108 can prevent the user from realizing full device operation capability during a distracted state with the aim of forcing the user to stop manipulating the mobile device 102 until the distraction is removed and the user exhibits a concentrated state.

Figure 8:
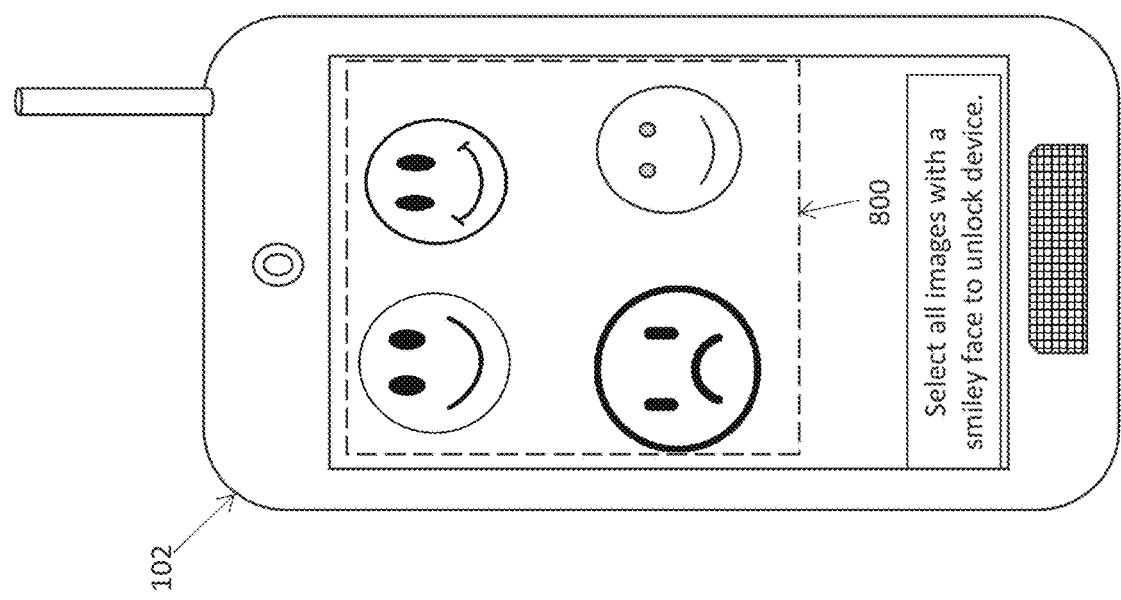
FIG. 8 depicts a mobile device displaying a challenge-response test to confirm a concentrated state of a user according to a non-limiting embodiment.

In at least one non-limiting embodiment, the main processor 108 can present the user with a challenge-response test to confirm the concentrated state of the user. When, for example, a user attempts to operate the mobile device 102 and/or access an App during a distracted state or while the mobile device 102 is operating in the distraction mode, the main processor 108 can automatically invoke a challenge-response test 800 which is displayed on the mobile device 102 as shown in FIG. 8. In response to receiving a valid input to the challenge-response test (e.g., select all the smiley face icons on the display), the main processor 108 can allow the user to operate the mobile device 102 in the normal mode or exit the distracted mode and invoke the normal mode.

The challenge-response test 800 can include, for example, a "Completely Automated Public Turing test to tell Computers and Humans Apart") CAPTCHA. Accordingly, a valid answer can be a correct number of selected icons from a multiple number of test icons displayed on the display unit 106, a correct input of a distorted test word displayed on the display unit 106, or a correct number of selected images from a test image displayed on the display unit 106. The valid input aims to verify that the user operating the mobile device 102 is in the concentrated state.

Figure 9:
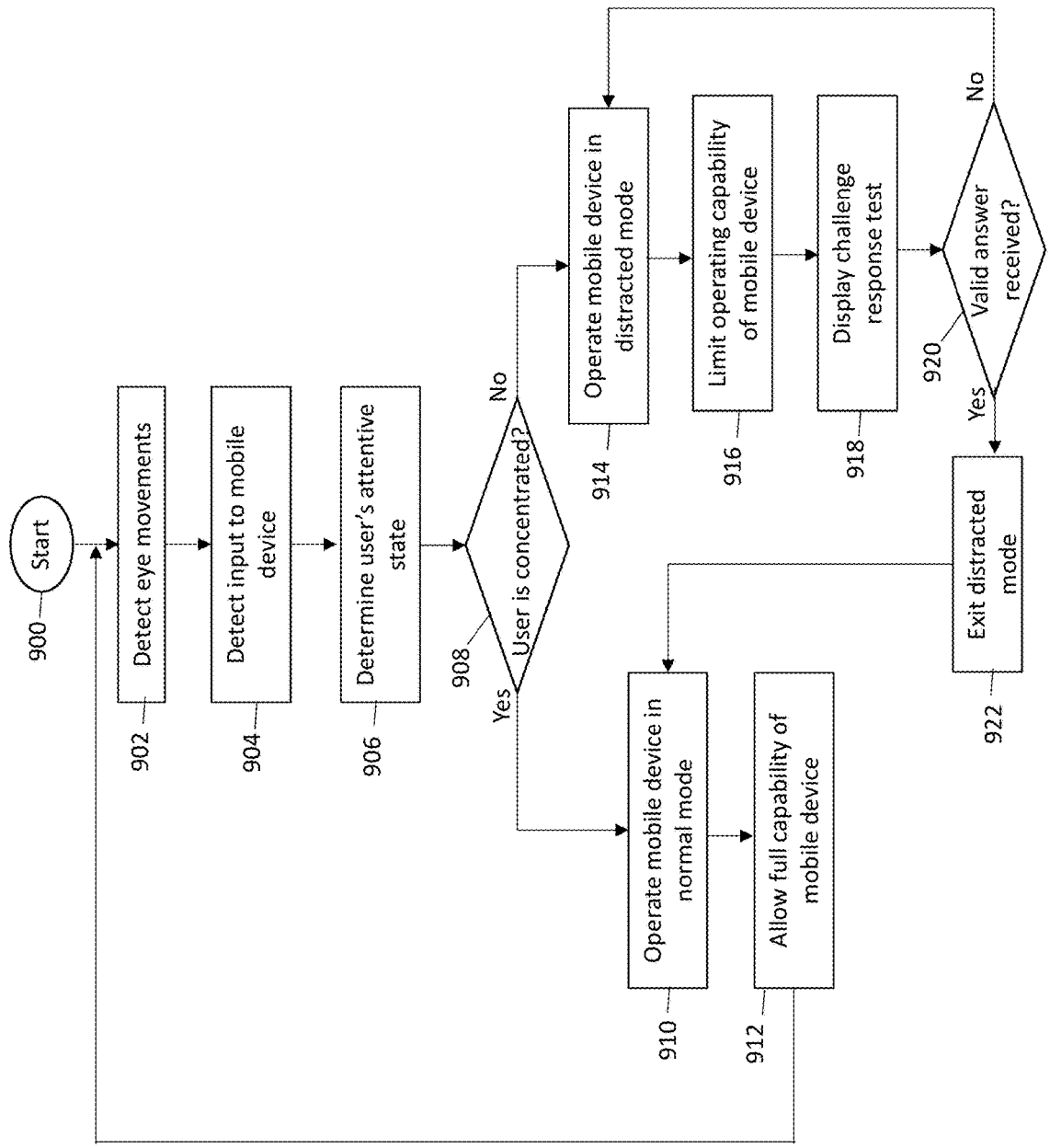
FIG. 9 is a flow diagram illustrating a method of controlling a mobile device using an eye tracking control system according to a non-limiting embodiment.

With reference now to FIG. 9, a flow diagram illustrates a method of controlling a mobile device using an eye tracking control system according to a non-limiting embodiment. The method begins at operation 900, and at operation 902 a user's eye movements are detected via the mobile device. At operation 904, a user's input to the mobile device is detected. The input includes, for example, touch inputs applied to the display unit, keyboard inputs or typing inputs, gesture inputs, and camera image inputs. At operation 906, a user's attentive state is determined. For instance, the mobile device can determine whether the user is in a concentrated state or a distracted state at operation 908. When the user is determined to be in a concentrated state, the normal mode of the mobile device is invoked at operation 910. Accordingly, the user can utilize the full operating capabilities of the mobile device at operation 912, and the method returns to operation 902 to continue detecting the user's eye movements.

When, however, the user is not determined to be in a concentrated state (i.e., the user is determined to be distracted) at operation 908, the distracted mode of the mobile device is invoked at operation 914. Accordingly, the user is allowed to operate the mobile device with limited capabilities at operation 916. While operating in the distracted mode, for example, the mobile device may deactivate typing input capabilities and camera capabilities, while allowing for voice recognition. At operation 918, the mobile device displays a challenge-response test. When a valid answer to the challenge response test is not received at operation 920, the method returns to operation 914 and maintains the mobile device in the distracted mode. When, however, a valid answer is received, the distracted mode is exited at operation 922 and the normal operating mode is invoked at operation 910. Accordingly, the user can utilize the full operating capabilities of the mobile device at operation 912, and the method returns to operation 902 to continue detecting the user's eye movements.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A mobile device comprising:
   an eye detection sensor configured to detect movements of a human eye and to generate an eye detection signal indicative of detected eye movements of a user of the mobile device;
   an input timing unit in signal communication with the eye detection sensor to receive the eye detection signal, the input timing unit configured to detect an input delivered to the mobile device while receiving the eye detection signal, and to determine an input rate at which the input is delivered;
   an eye tracking control system in signal communication with the eye detection sensor, the eye tracking control system configured to determine a concentrated state of the user and a distracted state of the user based on the detected eye movements, and to selectively operate the mobile device in different modes based on the concentrated state and the distracted state,
   wherein the eye tracking control system operates the mobile device in a first mode that provides a plurality of device capabilities to the user in response to determining the concentrated state, and operates the mobile device in a second mode that applies at least one limitation to the plurality of device capabilities in response to determining the distracted state.

2. The mobile device of claim 1, wherein the eye tracking control system comprises:
   an eye tracking unit in signal communication with the eye detection sensor, the eye tracking unit configured to receive the eye detection signal and to determine at least one characteristic of the detected eye movements of a user;
   a permission unit configured to determine the concentrated state and the distracted state of the user based at least in part on the at least one characteristic of the detected eye movements and to generate a permissions control signal indicating the concentrated state and the distracted state; and
   a main processor in signal communication with the permission unit, the main processor configured to invoke the different modes of the mobile device based on the permissions control signal.

3. The mobile device of claim 2, further comprising an eye tracking visualization unit in signal communication with the eye tracking unit, the eye tracking visualization unit configured to generate a graphical representation of the detected eye movements of the user.

4. The mobile device of claim 3, wherein the graphical representation includes one or both of a gaze plot and a fixation heat map.

5. The mobile device of claim 1, further comprising an input pattern unit in signal communication with the eye detection sensor to receive the eye detection signal, the input pattern unit configured to detect the input delivered to the mobile device while receiving the eye detection signal, to determine an input pattern of the input.

6. The mobile device of claim 5, wherein the permissions unit is configured to determine the concentrated state and the distracted state of the user based on one or a combination of the gaze plot, the fixation heat map, the input rate, and the input pattern, and to output a permissions signal based on the concentrated state and the distracted state, and
   wherein the main processor operates the mobile device in the first mode that applies at least one operating limitation to the mobile device in response to receiving the permission denied signal, and the second mode removes the at least one operating limitation in response to receiving the permission accepted signal.

7. A method of operating a mobile device, the method comprising:
   detecting, via an eye detection sensor, movements of a human eye;
   generating, via the eye detection sensor, an eye detection signal indicative of detected eye movements of a user of the mobile device;
   determining, via an eye tracking control system, a concentrated state of the user and a distracted state of the user based on the detected eye movements; and
   selectively operating the mobile device in different modes based on the concentrated state and the distracted state,
   wherein selectively operating the mobile device in different modes comprises:
   operating the mobile device in a first mode that provides a plurality of device capabilities to the user in response to determining the concentrated state; and
   operating the mobile device in a second mode that applies at least one limitation to the plurality of device capabilities in response to determining the distracted state,
   wherein determining the at least one characteristic of the detected eye movements of a user further comprises:
   detecting, via an input timing unit, an input delivered to the mobile device while receiving the eye detection signal; and
   determining, via the input timing unit, an input rate at which the input is delivered.

8. The method of claim 7, wherein determining the concentrated state and the distracted state further comprises:
   determining, via an eye tracking unit, at least one characteristic of the detected eye movements of a user based on the eye detection signal; and determining, via a permission unit, the concentrated state and the distracted state of the user based at least in part on the at least one characteristic of the detected eye movements; and generating, via the permission unit, a permissions control signal indicating the concentrated state and the distracted state.

9. The method of claim 8, wherein selectively operating of the mobile device further comprises invoking, via a main processor, the different modes of the mobile device based on the permissions control signal.

10. The method of claim 9, wherein determining the at least one characteristic of the detected eye movements of a user further comprises generating, via an eye tracking visualization unit a graphical representation of the detected eye movements of the user, the graphical representation including one or both of a gaze plot and a fixation heat map.

11. The method of claim 7, wherein determining the at least one characteristic of the detected eye movements of a user further comprises:

detecting, via an input pattern unit the input delivered to the mobile device while receiving the eye detection signal; and determining, via the input pattern unit, an input pattern of the input.

12. The method of claim 11, further comprising:

determining, via the permissions unit, the concentrated state and the distracted state of the user based on one or a combination of the gaze plot, the fixation heat map, the input rate, and the input pattern;

outputting the permissions signal based on the concentrated state and the distracted state, the permissions signal including a permission denied signal or a permission accepted signal;

invoking, via the main processor, the first mode of the mobile device to apply at least one operating limitation to the mobile device in response to receiving the permission denied signal; and invoking, via the main processor, the second mode of the mobile device to remove the at least one operating limitation in response to receiving the permission accepted signal.

13. A computer program product to control a mobile device, the computer program product comprising a computer readable storage medium having program instructions embodied therewith, the program instructions executable by an electronic computer processor to control the mobile device to perform operations comprising:

detecting, via an eye detection sensor, movements of a human eye;

generating, via the eye detection sensor, an eye detection signal indicative of detected eye movements of a user of the mobile device;

determining, via an eye tracking control system, a concentrated state of the user and a distracted state of the user based on the detected eye movements, the determining a concentrated state of the user and a distracted state of the user comprising:

determining, via an eye tracking unit, at least one characteristic of the detected eye movements of a user based on the eye detection signal; and determining, via a permission unit, the concentrated state and the distracted state of the user based at least in part on the at least one characteristic of the detected eye movements, wherein determining the at least one characteristic of the detected eye movements of a user further comprises:

generating, via an eye tracking visualization unit a graphical representation of the detected eye movements of the user, the graphical representation including one or both of a gaze plot and a fixation heat map, wherein the concentrated state and the distracted state of the user are based on one or a combination of the gaze plot, the fixation heat map, an input rate, and an input pattern; and generating, via the permission unit, a permissions control signal indicating the concentrated state and the distracted state; and selectively operating the mobile device in different modes based on the concentrated state and the distracted state based on the permissions control signal, wherein selectively operating the mobile device in different modes comprises:

operating the mobile device in a first mode that provides a plurality of device capabilities to the user in response to determining the concentrated state;

operating the mobile device in a second mode that applies at least one limitation to the plurality of device capabilities in response to determining the distracted state; and outputting, via the permission unit, the permissions signal based on the concentrated state and the distracted state, the permissions signal including a permission denied signal or a permission accepted signal.

14. The computer program product of claim 13, further comprising:

invoking, via the main processor, the first mode of the mobile device to apply at least one operating limitation to the mobile device in response to receiving a permission denied signal; and invoking, via the main processor, the second mode of the mobile device to remove the at least one operating limitation in response to receiving a permission accepted signal.

* * * * *